United States Patent
Volonakis

(10) Patent No.: US 10,966,444 B2
(45) Date of Patent: Apr. 6, 2021

(54) METHOD FOR FREEZING OLIVE OIL

(71) Applicant: Asterios Volonakis, Athens (GR)

(72) Inventor: Asterios Volonakis, Athens (GR)

( * ) Notice: Subject to any disclaimer, the term of this patent is extended or adjusted under 35 U.S.C. 154(b) by 200 days.

(21) Appl. No.: 16/068,411

(22) PCT Filed: Dec. 21, 2016

(86) PCT No.: PCT/GR2016/000069
§ 371 (c)(1),
(2) Date: Jul. 6, 2018

(87) PCT Pub. No.: WO2017/130008
PCT Pub. Date: Aug. 3, 2017

(65) Prior Publication Data
US 2019/0037892 A1    Feb. 7, 2019

(30) Foreign Application Priority Data
Jan. 28, 2016  (GR) .............................. 20160100032

(51) Int. Cl.
| | | |
|---|---|---|
| *A23L 3/36* | (2006.01) | |
| *A23D 9/06* | (2006.01) | |
| *A01D 46/00* | (2006.01) | |
| *A23L 3/375* | (2006.01) | |
| *B01D 11/02* | (2006.01) | |

(52) U.S. Cl.
CPC .............. *A23L 3/362* (2013.01); *A01D 46/00* (2013.01); *A23D 9/06* (2013.01); *A23L 3/36* (2013.01); *A23L 3/375* (2013.01); *B01D 11/0288* (2013.01); *A23V 2002/00* (2013.01)

(58) Field of Classification Search
CPC . A23L 3/36; A23L 3/375; A23L 3/362; C11B 1/06; A23B 7/04; A23D 9/06
USPC .......................................................... 554/8
See application file for complete search history.

(56) References Cited

U.S. PATENT DOCUMENTS 6,331,643 B1    12/2001   Martini Bernardi et al.

OTHER PUBLICATIONS

Piscopo et al. Packaging and Storage of Olive Oil (Year: 2012).*
Board, the Complete Technology Book of Essential Oils (Aromatic Chemicals) (Year: 2011).*
Broaddus, Help! My Olive Oil Has Solidified in the Cold (Year: 2016).*
El-Sohaimy et. al., Effect of Harvesting in Different Ripening Stages on Olive (*Olea europea*) Oil Quality (Year: 2016).*
Dannnnak et al. Material Balance of Olive Components in Virgin Olive Oil Extraction Processing (Year: 2015).*
Vossen, Olive Oil Production (Year: 2005).*
Piscopo et al., "Packaging and storage of olive oil," *Olive Germplasm—The Olive Cultivation, Table Olive and Olive Oil Industry in Italy*, InTech, 22 pp. (2012).
European Patent Office, International Search Report in International Patent Application No. PCT/GR2016/000069, 4 pp, (dated Jul. 8, 2017).
European Patent Office, Written Opinion in International Patent Application No. PCT/GR2016/000069, 6 pp, (dated Jul. 8, 2017).

* cited by examiner

*Primary Examiner* — Erik Kashnikow
*Assistant Examiner* — Lela S. Williams
(74) *Attorney, Agent, or Firm* — Leydig, Voit & Mayer, Ltd.

(57) ABSTRACT

Method for freezing olive oil which achieves the sustaining of the polyphenols until the time of its consumption. The method is performed immediately after the collection of the fruit olives from the tree, with the addition of nitrogen, the cold extraction of the oil and the remaining of the oil pulp in water of 27° C. temperature at the softening for 30 minutes. The product is being transferred in stages at storage tanks with nitrogen supply and gradual at stages reduction of the temperature by 5° C. and remaining in each storage tank for 12 hours until its temperature reaches 6-7 degrees, after which it is being packaged and frozen with slow in stages freeze to −18° C. to −23° C. Due to this method the product maintains during the whole internal of freezing the color and aroma and the taste it has during its transformation into oil, organic characteristics that reappear exactly the same after it has been defrosted.

17 Claims, No Drawings

METHOD FOR FREEZING OLIVE OIL

CROSS-REFERENCE TO RELATED APPLICATIONS

This patent application is a national phase application of International Patent Application No. PCT/GR2016/000069, filed Dec. 21, 2016, which claims priority from Greek Patent Application No. 20160100032, filed Jan. 28, 2016, each disclosure of which is incorporated by reference in its entirety.

The present invention refers to a method of process and maintenance of vegetable olive oil.

At the Koronian variety of olive tree, which is mainly cultivated in Crete, at certain areas appears to have certain polyphenols very high, in other words at multiple times from the usual measured amounts. This characteristic is attributed to the special climate of the region with the combination with the enriched ground for hundreds of years with elements as the natural greenery of the area, the sunny days and the temperature. These areas are basically mountainous where apparently dominate the lower temperatures as compared to the plains, so the maturity of the olive is especially delayed. At this time, and whilst the olive is still unripe, these elements, the polyphenols, that make the olive oil besides being tasty being also therapeutical, are vertically developed. The polyphenols, natural antioxidant substances, offer to the plant antioxidant function, protecting the fruit (olive) and consequently the olive oil from becoming rancid, caused by the exposure of the plant to the air and the solar radiation. An olive oil with high content of polyphenols can withstand the time while its' consumption protects the human cells from the oxidation stress.

Numerous studies demonstrate that olive oil polyphenols have cardioprotective, anti-inflammatory, anticancer and antibacterial properties and they also contribute to the fight against Parkinson disease, as recently evinced.

According to the above, polyphenols are very significant elements of olive oil, exceptionally beneficial to the human health. However, the producers usually do not harvest the olives when the polyphenols are in complete development because at that time the fruit (olive) is still unripe and if the harvest takes place at that time the quantity of olive oil expected to be produced would be much smaller from the quantity to be produced from the ripe olive, although the beneficial polyphenols would be at reduced quantity during the harvesting. Moreover, the producers usually do not harvest at the time the polyphenols are of a complete development because, whilst this happens when the olive is not ripe yet, the disconnection of the olive from the tree at that time is very difficult with the means they usually use for the collection of the olives. For the above cited reasons the precious olive oil elements, from the time of maturity of the olives, of processing, storaging, bottling, transporting and remaining in warehouses or in commercial stores shelves, they are slowly reduced and completely disappear.

According to the European Safety Authority official announcement (EFSA Journal number 2011/9(4):2033) "Polyphenols contribute to the protection of lipids in the blood from the oxidation stress" (EFSA Journal number 2011/9(4):2033). A similar definition also contains the recent European Committee Regulation 432/2012 (EU) no. 432/2012 of May 16, 2012 "Establishing a list of permitted health claims made on foods, other than those referring to the reduction of disease risk and to children's development and health" known as "Health Claims", according to its' definition "Olive oil polyphenols contribute to the protection of blood lipids from oxidative stress". According to the above, olive oils with polyphenols over 250 gr/kg could carry at their packaging the indication "Health claim".

However the problem with polyphenols is that they are exceptionally sensitive and destroyed very easily.

To begin with, at the transportation stage from the harvesting space to the oil mill, that is the way and the container in which the olives are transported.

The time that elapses from the harvesting to transform into oil, is also significant. The more the olive is exposed to the oxygen without the support of the tree with its juice, the quicker it is oxidized.

After that during the process of extraction of olive oil in the oil mill. For example, the polyphenols are destroyed when the temperature of the oil pulp passes the 28° C., because then the water-solution ability of the polyphenols is increased and they are rejected together with the water extracts. Also they are destroyed the more time beyond the 30 minutes the olive pulp remains in the softening process.

Their annihilation however becomes complete as long as the packaged olive oils remain in storage and on the stores' shelves.

For years continuous measurements on packaged products take place at given time interval, from their bottling, for example every two months, and the results in most of the cases are that within six months the polyphenols have been reduced or have been completely destroyed.

The packaging of the olive oil in a transparent bottle (instead of in green glass or aluminum) accelerates the destruction of the polyphenols. Consequently when the consumer buys the packaged olive oil at a time more than six months after its' production, the polyphenols usually have been destroyed almost completely and the consumer is not benefiting of its' beneficial properties.

Thus, after the listing of polyphenols in the Health Claims list, doubts started appearing regarding the validity of the above mentioned Health Claim, in scientific conferences and related studies about olive oil; for the reason, that valuable element, the polyphenols, on the basis of which a producer is entitled to write on the labeling the Health Claim, is not valid when and provided the day the consumer is using the olive oil, the indicated on the packaging quantity of polyphenols does not exist on the product anymore.

Consequently, the problem to be solved is to discover a method that will secure the maintenance of these precious polyphenols in the olive oil, from the moment of harvesting the olives, to the moment of consumption by the consumer.

Today's state of the art is using traditional methods to solve the problem of the fast destruction of polyphenols, such as the storage in areas without light, its' packaging in glass bottles of dark green colour, that is methods delaying for a short time the destruction of polyphenols, but for an interval that usually does not go beyond 6 months.

The present invention solves the problem of maintaining the polyphenols in the olive oil, by applying method of freezing the olive oil at a slow and step-by-step freezing, in a way that all the polyphenols that exist in the olive tree fruit (olive) during the extraction of oil, to be sustained unaltered until the moment of its' consumption by the final consumer.

In summary, the method is performed by the following steps:

Measurement of polyphenols on the olive on the tree takes place in order to establish the time the polyphenols are at their highest point.

The collection of olives and its transportation to the oil mill takes place in special metallic containers where nitrogen is supplied.

The conversion to oil takes place in cold, in water temperature of 27° C. and the oil pulp remains in the beater for 30 minutes.

Following it is transferred to a storage tank with nitrogen at temperature of 27° C. for 12 hours and then it is transferred continually in other deposit tanks, reducing every time in stages the temperature by 5° C., with the same time interval of waiting, until it reaches 7° C., then it is packaged and is frozen at a slow step by step refrigeration.

Due to this method the product maintains during the whole freezing time the following of its' characteristics, which during defrosting reappear as they are originally.

1. The color of the olive oil is all green that is exactly as it is at the moment of the olive extraction of the unripe olive.
2. Its' aroma is strong, a combination of grass and area plants of the area, like the olives were just harvested from the tree, because due to freezing, the aromas are still there.
3. The olive oil taste, because of the strong appearance of polyphenols is intense and known only to those who know the product because they participate in the oil production. Contrary, to the average consumer who is used to the taste of the olive oil a few months after its production, it is a taste exceptionally intense and rich.

The method of freezing olive oil is analytically described further down and is performed by the following steps:

Step 1:

Observation of the olive trees to decide on the best day to harvest the olives. At early beginning of November and according to each year's climate conditions, starts the first quick measurement, of polyphenols on the olive tree, estimating the highest level in relation to the measurements of the last three years. The measurement of polyphenols takes place with any of the known methods of the state of the art, such as for example with the fast method H1-NMR. The method of freezing olive oil is applied in the same way and when the collection of olives does not take place during the time the polyphenols are at the highest level.

Step 2:

The olives are collected in specially formed metallic containers preferably of 30 kg each, because at a larger packaging the olives are pressed by their own weight and are damaged, moreover it is easier to transport them. After the olives are placed in the containers, nitrogen is passed in the empty space by a portable bottle that the collectors carry with them, so that from the moment of harvest the olives are no longer exposed to oxygen. When the harvest, the storage and the crashing of the olives is done carefully, then the enzyme oxidation is being avoided.

Step 3.

Adopting the rules of oil procession applied for the production of biological olive oil, the olives are transported to the olive mills which can extract the oil with cold extraction as well as to secure the separation to avoid the infection by conventional oils.

During olive oil production by cold extraction the temperatures of the water reach 27° C. and at this temperature is that the present method for freezing olive oil is also applied.

The product remains in the softening facilities for 30 minutes maximum.

Step 4:

The product is driven into a first inox storage tank with the supply of nitrogen, where the temperature prevailing condition is at 27° C. and there it remains for 12 hours.

Following, it is transferred into a $2^{nd}$ inox tank, with the supply of nitrogen at a temperature 5° C. lower than the previous one, so it is about 22° C., where it remains 12 more hours.

Following it is transferred into a $3^{rd}$ inox tank, with the supply of nitrogen and at a temperature 5° C. lower than the previous one, so it is about 17° C., where it remains 12 more hours.

Following it is transferred into a $4^{th}$ inox tank, with the supply of nitrogen and at a temperature 5° C. lower than the previous one, so it is about 12° C., where it remains 12 more hours.

Finally, it is transferred into a $5^{th}$ inox tank, with the supply of nitrogen and at a temperature of 5° C. lower of the previous one, so it is about 7° C., where it remains for 24 hours to «relax».

The ultimate result of the method's performance is achieved when the temperature degrees at each deposit tank are reduced by 5 (±1) degrees C.

The ultimate result of the method's performance is achieved when the product remains for 12 hours in each storage tank. This has mainly to do with the calm the product needs, being disturbed by moving it from tank storage into tank storage.

Nevertheless, the invention is performed the same way even when the temperature degrees at each storage tank are reduced by 2 degrees every 4 hours, with the corresponding staying time in each storage tank, either by using more storage tanks or by recycling the same ones, until the product's temperature goes down at 6-7° degrees. For the maximum performance of the method, the process duration until the temperature of the product goes down to 7° must be totally 60 hours.

The invention is performed the same way even when the olive oil is not moved in stages into five storage tanks until its' temperature goes down to 7° C., but into fewer deposit tanks, or if it remains in the initial storage tank reducing the temperature by 2° C. every 4 hours, as mentioned in a previous paragraph, where for the best performance of the method, the duration of the process until the product temperature goes down to 7° C. must be in total time of 60 hours. This variation of the method is difficult to be applied in a production line of the product for commercial use, so the flow process from one deposit tank into another is applied.

Step 5:

The product is packaged in containers of one dose or to any traditional storage containers, glass, plastic and aluminium of various quantities of probable market demand.

Step 6:

After the completion of the temperature reduction cycle and after packaging, the freezing of the product follows. As the whole of the previous process, the same for this too it must be frozen not fast but slow and in stages, at −18 to −23° C.

The gradual slow and in stages and not the abrupt freeze of this specific product is exceptionally significant for the life and also the quality of polyphenols after defrosting. Several experiments of various ways of freezing, showed weaker chemical and microscopic results.

For example:

Life duration of polyphenols of liquid Extra Virgin Olive Oil: about 6 months.

Life duration of polyphenols of Extra Virgin Olive Oil of abrupt freeze: 10 20 days.

Life duration of polyphenols of Extra Virgin Olive Oil of slow in stages freezing: 3 months.

The advantages of this method are the following:

The polyphenols, which are destroyed in few months during the storage of the product at the warehouses and at shelves, remain in their totality until the unfreezing and consumption of the olive oil. Following, olive oil becomes an excellent ally for good health.

Due to the freezing method, the product is protected from the temperature and the light and thus its' quality is maintained unaltered until the time of tunfreezing and consumption by the consumer.

Due to the freezing method, the lifespan of a quality olive oil goes from 12 months when packaged in liquid form as it is today, can reach up to 3 years as frozen.

Also, the freezing of olive oil makes much easier the handling of its' use, the measurement of the precise quantity needed in each case and the easy counting without cookie scoops nor measurements, so it facilitates the product saving and the reduction of waste.

Moreover, it solves the problem of storage and of the date of its expiration, makes the use of the product ease, fast, keeping clean the food processing facilities.

The invention claimed is:

1. A method for preserving polyphenols when producing and freezing olive oil, comprising:
    extracting olive oil from olives using a cold extraction method;
    immediately following extraction of olive oil using the cold extraction method, collecting the olive oil into a first stainless container, and providing nitrogen gas into the first stainless the container;
    storing the olive oil in the first stainless container for 12 hours at a temperature of 27° C.;
    gradually transferring the olive oil from the first stainless container into subsequent containers during a series of stages, each of the series of stages being carried out in the presence of nitrogen gas, wherein at each olive oil transfer stage in the series of stages from one subsequent container to another, the temperature of the olive oil is decreased by about 5° C., wherein a total temperature decrease over the series of stages is from 27° C. to 7° C., and wherein the olive oil is stored at the decreased temperature during each of the series of stages for 12 hours;
    packaging the olive oil into retail containers following completion of a last stage of the series of stages; and
    freezing the olive oil in the retail containers to a temperature of between −18° C. to −23° C.

2. The method of claim 1, wherein the cold extraction method is carried out using cooling water that is colder than 28° C., and wherein extracting olive oil from the olives using the cold extraction method includes processing a batch of olives in an oil mill, wherein a conversion of the batch of olives to olive oil using the oil mill is completed in less than 30 minutes.

3. The method of claim 1, wherein gradually transferring the olive oil from the first stainless container into subsequent containers during the series of stages, comprises:
    transferring the olive oil from the first stainless container into a second stainless container in a first stage of the series of stages, and providing nitrogen gas to the second stainless container;
    storing the olive oil in the second stainless container for at least 12 hours at a temperature of 22° C.;
    transferring the olive oil from the second stainless container into a third stainless container in a second stage of the series of stages, and providing nitrogen gas to the third stainless container;
    storing the olive oil in the third stainless container for at least 12 hours at a temperature of 17° C.;
    transferring the olive oil from the third stainless container into a fourth stainless container in a third stage of the series of stages, and providing nitrogen gas to the fourth stainless container;
    storing the olive oil in the fourth stainless container for at least 12 hours at a temperature of 12° C.;
    transferring the olive oil from the fourth stainless container into a fifth stainless container in the last stage of the series of stages, and providing nitrogen gas to the fifth stainless container; and
    storing the olive oil in the fifth stainless container for at least 24 hours at a temperature of 7° C. before packaging the olive oil into the retail containers.

4. The method of claim 1, wherein decreasing the temperature of the olive oil includes cooling the olive oil by 5±1° C.

5. The method of claim 1, wherein a time from the harvest time to the freezing of the olive oil in the retail containers is completed in less than 60 hours.

6. The method of claim 1, wherein the retail containers are made from a material selected from the group consisting of glass, plastic, and metal.

7. The method of claim 1, further comprising:
    harvesting olives at a harvest time;
    collecting the olives in metallic harvest containers; and
    storing the olives in the metallic harvest containers in the presence of a nitrogen gas environment.

8. The method of claim 7, further comprising:
    measuring a concentration of polyphenols in the olives, before the olives are harvested; and
    determining the harvest time when the concentration of polyphenols is at a maximum level.

9. The method of claim 1, wherein the retail containers are single serving containers.

10. A method for producing and freezing olive oil, comprising:
    harvesting olives at a harvest time, and collecting the olives in metallic harvest containers;
    supplying nitrogen gas in the harvest containers;
    extracting olive oil from the olives using a cold extraction method;
    collecting the olive oil into a container immediately after extraction, and providing nitrogen gas in the container;
    storing the olive oil in the container for 12 hours at a temperature of 27° C.;
    cooling the olive oil in 2° C. increments from the temperature of 27° C. to a temperature between 6-7° C., and maintaining the olive oil at each incrementally colder temperature for at least 4 hours and in the presence of nitrogen gas;
    packaging the olive oil into retail containers; and
    freezing the olive oil in the retail containers to a temperature of between −18° C. to −23° C.

11. The method of claim 10, further comprising:
    harvesting olives at a harvest time;
    collecting the olives in metallic harvest containers; and
    storing the olives in the metallic harvest containers in the presence of a nitrogen gas environment.

12. The method of claim 11, further comprising:
    measuring a concentration of polyphenols in the olives, before the olives are harvested; and
    determining the harvest time when the concentration of polyphenols is at a maximum level.

13. The method of claim 10, wherein the cold extraction method is carried out using cooling water that is colder than 27° C., and wherein extracting olive oil from the olives using the cold extraction method including processing a batch of olives in an oil mill, wherein a conversion of the batch of olives to olive oil using the oil mill is completed in less than 30 minutes.

14. The method of claim 10, wherein decreasing the temperature of the olive oil includes cooling the olive oil by 2±1° C.

15. The method of claim 10, wherein a time from the harvest time to the freezing of the olive oil in the retail containers is completed in less than 60 hours.

16. The method of claim 10, wherein the retail containers are made from a material selected from the group consisting of glass, plastic, and metal.

17. The method of claim 10, wherein the retail containers are single serving containers.

\* \* \* \* \*